(12) United States Patent
Defenbaugh et al.

(10) Patent No.: US 8,794,248 B2
(45) Date of Patent: Aug. 5, 2014

(54) HEADBAND WITH ANGLED TOP SECTION FOR IMPROVED COMFORT AND FIT

(75) Inventors: Michael Defenbaugh, Marietta, GA (US); Stan Chudzik, Alpharetta, GA (US)

(73) Assignee: Goody Products, Inc., Atlanta, GA (US)

( * ) Notice: Subject to any disclaimer, the term of this patent is extended or adjusted under 35 U.S.C. 154(b) by 690 days.

(21) Appl. No.: 12/366,411

(22) Filed: Feb. 5, 2009

(65) Prior Publication Data

US 2009/0194130 A1 Aug. 6, 2009

Related U.S. Application Data

(60) Provisional application No. 61/026,214, filed on Feb. 5, 2008.

(51) Int. Cl.
*A45D 8/00* (2006.01)

(52) U.S. Cl.
USPC .......................................................... 132/273

(58) Field of Classification Search
USPC ............................... 132/273–277; D28/39, 41
See application file for complete search history.

(56) References Cited

U.S. PATENT DOCUMENTS

| | | | |
|---|---|---|---|
| 2,171,019 A | 8/1939 | Zupnyk | |
| 3,211,160 A | 10/1965 | Miller | |
| 5,419,758 A | 5/1995 | Vijayan | |
| 5,449,008 A | 9/1995 | Yeh | |
| 5,590,422 A | 1/1997 | Henderson | |
| 5,692,243 A | 12/1997 | Chang | |
| 5,697,386 A | 12/1997 | Chang | |
| 5,826,597 A | 10/1998 | Chou | |
| 5,937,872 A | 8/1999 | Wang | |
| 6,205,590 B1 | 3/2001 | Gorman | |
| 6,470,896 B1 | 10/2002 | Mensonides | |
| D494,711 S | 8/2004 | LeBow | |
| D511,036 S | 11/2005 | Moses | |
| 7,058,989 B2 | 6/2006 | Domingos | |
| 2006/0111485 A1 | 5/2006 | Laghi | |
| 2006/0162046 A1 | 7/2006 | Chudzik et al. | |
| 2009/0032050 A1* | 2/2009 | Defenbaugh et al. | 132/273 |

OTHER PUBLICATIONS

DuPont; DuPont Nylon 6,6 High Tenacity (HT) Airbag Yarn; webpage: www2.dupont.com/automotive/en_US/products_services/protect . . . ; Feb. 3, 2009; 1 page.
Conair Corporation; Scunci: Thick Hair New Wave Headband; webpage: www.scunci.com/products_details.aspx?gid=7&pid=133&p=7; Jan. 30, 2009; 2 pages.
K-Resin; K (Fiber) 03-01, 03-02, 03-03; Article; Revision date Jan. 2008; 3 pages.

(Continued)

*Primary Examiner* — Rachel Steitz
(74) *Attorney, Agent, or Firm* — Lempia Summerfield Katz LLC

(57) ABSTRACT

A headband includes an angled top section that enables the headband to better conform to the contour of the top of the user's head for a better fit in that area. In addition, the headband may be made of a memory-flex deformable material that enables it to conform to the contour of the top and sides of the user's head for a more comfortable fit in those areas. In some embodiments the headband has generally linear legs and in other embodiment the legs are swept back so they are positioned farther behind the user's ears.

19 Claims, 8 Drawing Sheets

(56) References Cited

OTHER PUBLICATIONS

International Search Report, Apr. 15, 2009 for PCT/US2009/033227; 9 pgs.

The International Bureau of WIPO; www.wipo.int; International Preliminary Report on Patentability; 7 pages; dated Aug. 10, 2010.

* cited by examiner

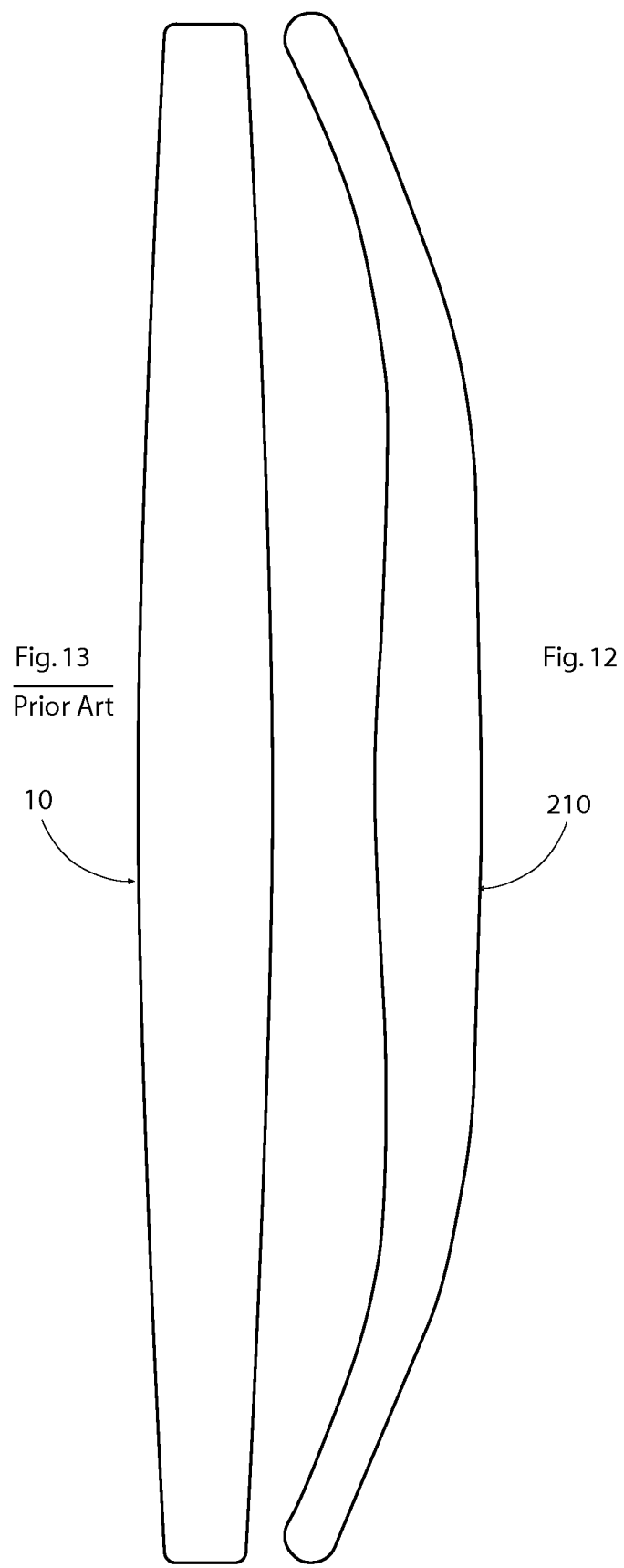

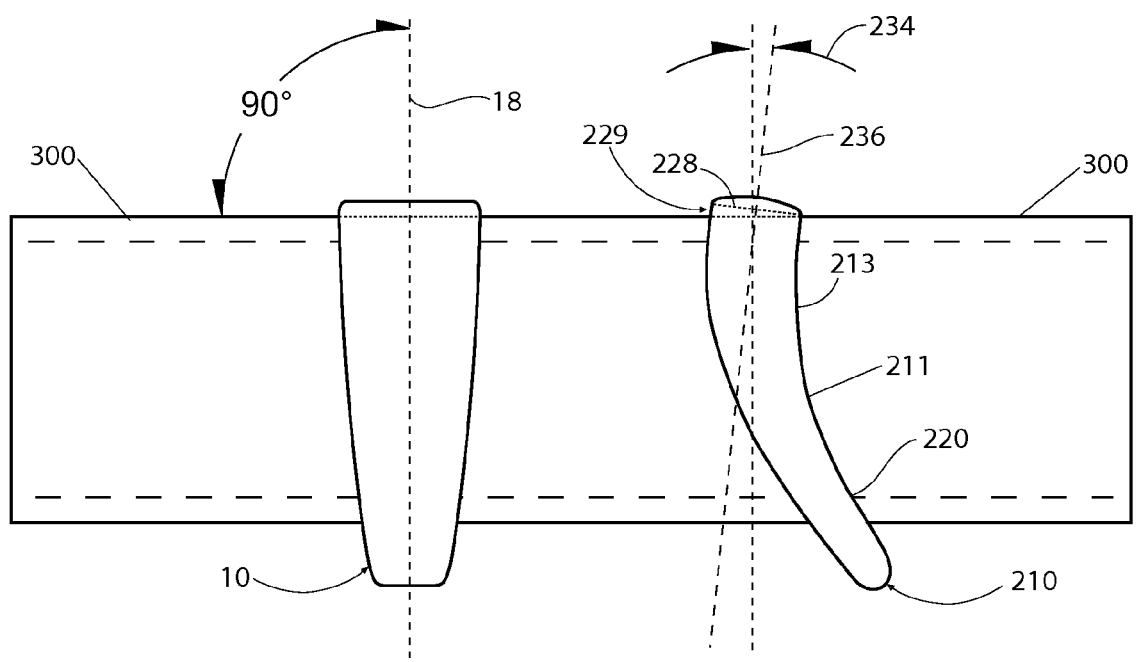
Fig. 15
Prior Art
Fig. 14
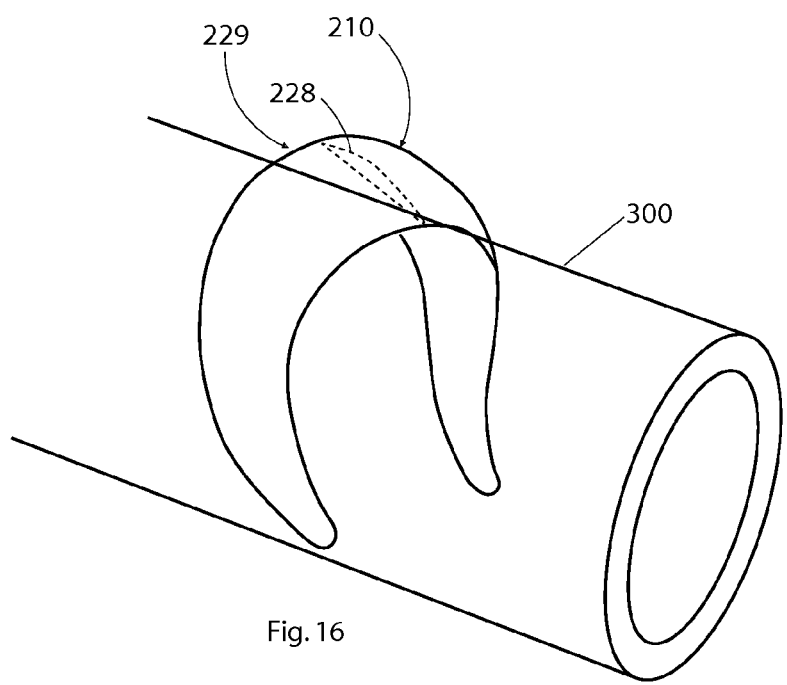
Fig. 16

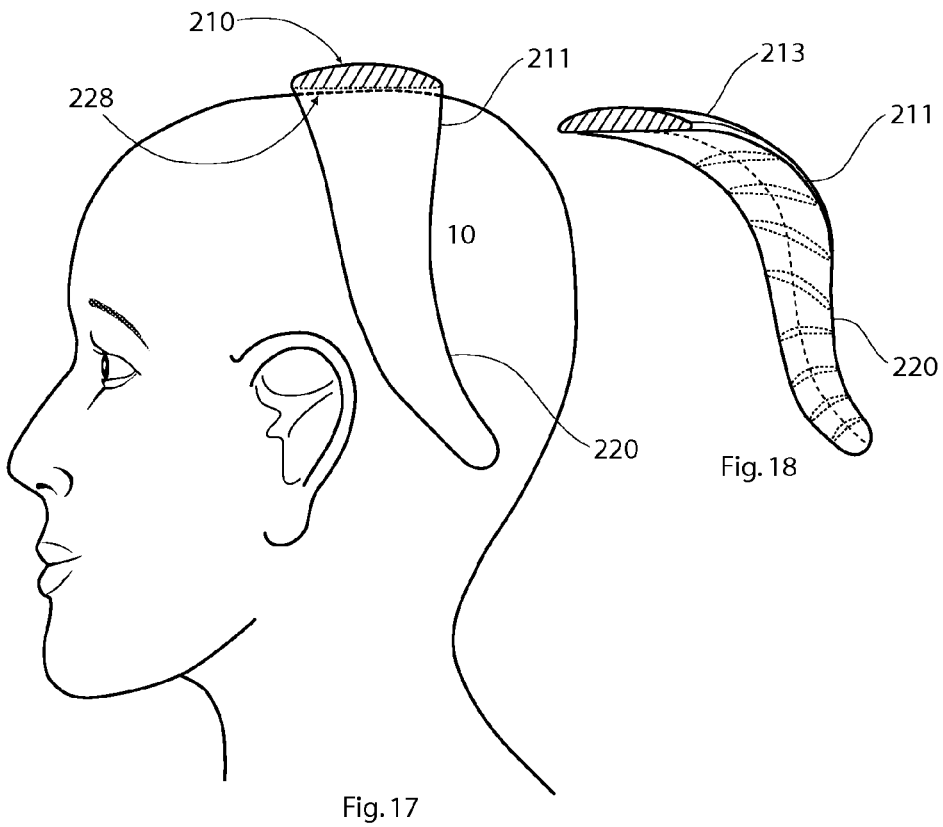
Fig. 17
Fig. 18
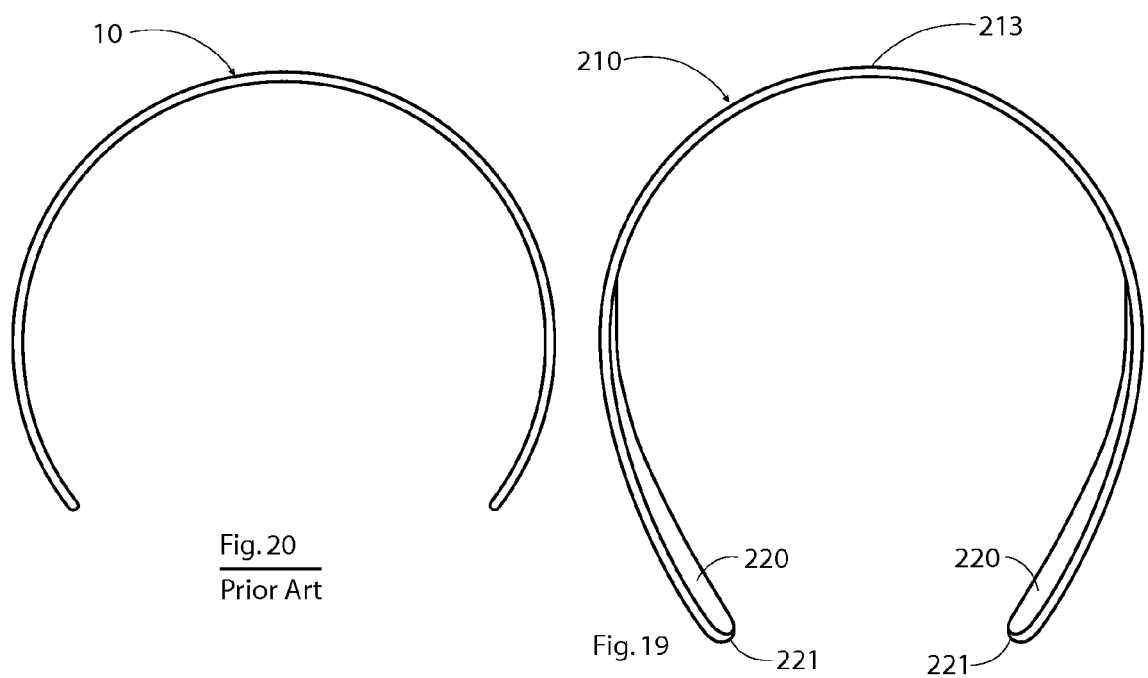
Fig. 20
Prior Art
Fig. 19

HEADBAND WITH ANGLED TOP SECTION FOR IMPROVED COMFORT AND FIT

CROSS-REFERENCE TO RELATED APPLICATION

This application claims the priority benefit of U.S. Provisional Patent Application Ser. No. 61/026,214, filed Feb. 5, 2008, the entire scope and content of which is hereby incorporated herein by reference.

TECHNICAL FIELD

The present invention relates generally to hairstyling accessories and, in particular, to headbands for wearing on a person's head.

BACKGROUND OF THE INVENTION

Many conventional headbands are made of hard plastic materials. These hard headbands can be uncomfortable for any of several reasons. The tips commonly apply too much pressure to the area of the head behind the ears and above the neck. This can cause headaches or other pain, and the sharp parting lines on the headband tips can scratch the head. These issues are exacerbated when the user wears the headband for long periods of time, for example, during an eight-hour workday. It is not uncommon for user's to remove these hard headbands after as little as one or two hours of use due to the pain or onset of a headache.

Others have tried to resolve this problem by over-molding a soft rubber material at the ends of the headband to provide a cushioning material between the tips of the headband and the user's head. Also, others have tried to resolve this problem by extending the length and the width of the headband ends in order to distribute the pressure over a wider surface area. Furthermore, others have tried to correct sharp parting lines on tips by gluing fabric over the ends of the tips to prevent scratching. Soft headbands (e.g., made of fabric or a stretchy material) do not have these problems, but they are not the preferred headband choice for many women.

These proposed solutions have not solved these problems. For instance, the over-molded tips provide a small improvement, but this solution does not eliminate the problem, especially when the headband is worn for an extended period of time. And extending the tips in length and width was found to be only beneficial for a small portion of the population and was found to be worse in a majority of the users' due to it not "fitting" comfortable to their head shape.

An additional problem, as illustrated in FIGS. 1 and 2, exists due to prior art headbands 10 having a top inner surface 12 that is flat at the apex of the headband to allow the headbands to be reversible such that either of the edges 14, 16 of the headband may be oriented in the front when worn by the wearer. As shown in FIG. 1, the flat top inner surface 12 is approximately perpendicular to a centerline 18 extending along the lengths of the legs 20 of the headband 10. The headband 10 generally does not conform to the crown of the wearer's head 22 to allow the headband apex to sit flatly against the wearer's head when the headband is worn. Due to this prior art configuration, the flat top surface 12 leads to the presence a gap 24 between the wearer's head 22 and the rear edge 16 of the headband 10 when the headband is positioned on the wearer's head.

Accordingly, it can be seen that a need exists for hard headbands that sufficiently secure to the wearer's head and are usable by wearers with different sized and shaped heads, without exerting pressure that causes discomfort to the wearer. Additionally, a need exists for headbands that more closely conform to the contour of the wearer's head and do not create gaps between the wearers' heads and the rear edges of the headbands when properly positioned on the wearer's head. It is to the provision of solutions meeting these and other needs that the present invention is primarily directed.

SUMMARY OF THE INVENTION

Generally described, the present invention provides a headband with novel features for providing a wearer more comfort and a better fit. In one aspect, the headband includes an angled top section that enables the headband to better conform to the contour of the top of the user's head for a better fit in that area. With the headband properly positioned on the head, the inner surface of the top section is positioned against the head, leaving no gap between the headband and the head. The inner surface of the top section and a lateral plane through a lateral centerline of the headband cooperatively form an acute angle. The legs of the headband can be straight or they can be swept backward so that the headband tips are positioned farther behind the ears.

In other embodiments, the headband body is made of a memory-flex deformable material that enables it to conform to the contour of the top and sides of the user's head for a more comfortable fit in those areas. The deformable material enables the headband body to be deformed and shaped to conform to the contour of the user's head without breaking the headband body, to retain its contoured shape so that the holding ability of the headband is not sacrificed, and to be later deformed from the contoured shape and still later reshaped back to fit the head again. And in other embodiments, the headband includes both the angled-top-section feature and the side-contour feature.

The specific techniques and structures employed by the invention to improve over the drawbacks of the prior art and accomplish the advantages described herein will become apparent from the following detailed description of the example embodiments of the invention and the appended drawings and claims.

BRIEF DESCRIPTION OF THE DRAWINGS

FIG. 12 is a plan view of the headband of FIG. 10 in a flattened-out position.

FIG. 13 is a plan view of the prior art headband of FIG. 1 in a flattened-out position.

FIG. 14 is a left side view of the headband of FIG. 10 with the headband legs sitting flush on a cylindrical fixture and the top section forming a front gap.

FIG. 15 is a left side view of the prior art headband of FIG. 1 with its entire length sitting flush on a cylindrical fixture.

FIG. 16 is a perspective view of the headband and cylindrical fixture of FIG. 14.

FIG. 17 is a left side view of the headband of FIG. 10 worn on a user's head with a cross-section of the top section positioned flat against the scalp.

FIG. 18 is a perspective detail view of a portion of the headband of FIG. 17, showing a series of cross-sections of the headband twisting along the length of the headband.

FIG. 19 is a front side view of the headband of FIG. 10 showing the twist of the headband body.

FIG. 20 is a front side view of the prior art headband of FIG. 1 showing the absence of a twist of the headband body.

DETAILED DESCRIPTION OF EXAMPLE EMBODIMENTS

Figure 1:
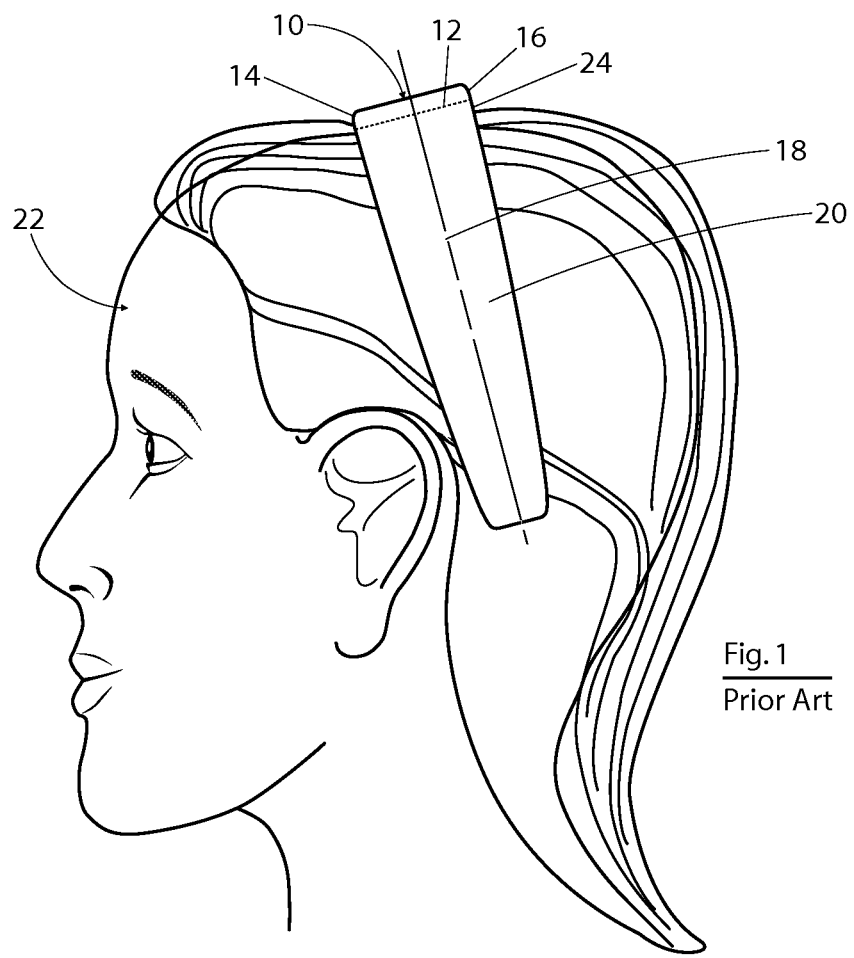
FIG. 1 is a left side view of a prior art headband worn on a user's head, showing a rear gap between a rear edge of the headband and the scalp.

FIGS. 3-9 illustrate a hard headband 110 according to a first example embodiment of the present disclosure. The headband 110 comprises a body 111 that is generally semi-circular (e.g., C-shaped) to generally conform to a typical person's head 122. The headband body 111 includes a top or crown section 113 and two oppositely arranged legs 120 that extend downwardly from the top section. The top section 113 is slightly curved in the depicted embodiment, but alternatively it could be generally flat. Each of the legs 120 terminates at a tip 121. In the depicted embodiment, the legs 120 are generally linear (i.e., they have a centerline that is generally linear), but alternatively they can be angled or swept back. In addition, the headband body 111 includes a front edge 114 and a rear edge 116. The headband 110 is a "hard" headband in that it is generally rigid and shape-retaining (as opposed to a "soft" headband made of fabric or a stretchy material).

In the depicted embodiment, the headband 110 has an angled top section 113 to fit more closely to the contour of the top of a typical person's head 122 from front to back. In this embodiment, the headband 110 is not reversible, and the front edge 114 and the rear edge 116 are oriented consistently each time the person puts on the headband. In typical commercial embodiments, the legs include indicia such as the letters "L" and "R," the words "Left" and "Right," or the like on the inner surface of the left and right legs. The headband 110 is positioned on the person's head with the legs 120 approximately aligned and parallel.

In particular, the top section 113 of the headband body 111 defines an inner surface 112 that is positioned adjacent the user's head 122 when the headband is worn. The inner surface 112 is angled with respect to a lateral plane 118 (defined by a lateral centerline 118 of the headband body top section 113) to achieve the more contoured fit. Specifically, an axial plane 126 passes through an axial centerline 126 of the headband body top section 113 and intersects the inner surface 112 to define an apex line 128 (see FIG. 4). The inner surface 112 is angled such that a front acute angle 130 is formed between the lateral plane 118 and the front portion of the apex line 128 (extending from the lateral-plane-to-apex-line intersection to the front edge 114 of the body 111). And a rear obtuse angle 132 is formed between the lateral plane 118 and the opposite rear portion of the apex line 128 (see FIG. 5). The front acute angle 130 is preferably about 80 degrees to about 88 degrees, more preferably about 81 degrees to about 86 degrees, and most preferably about 82 degrees to about 84 degrees.

Figure 6:
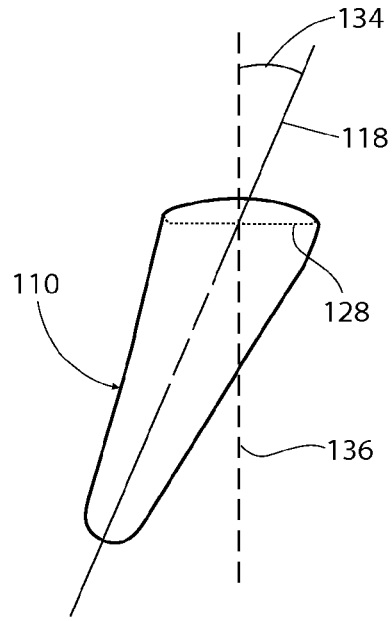
FIG. 6 is a right side view of the headband of FIG. 3, showing additional details of the angled top section of the headband.
Figure 9:
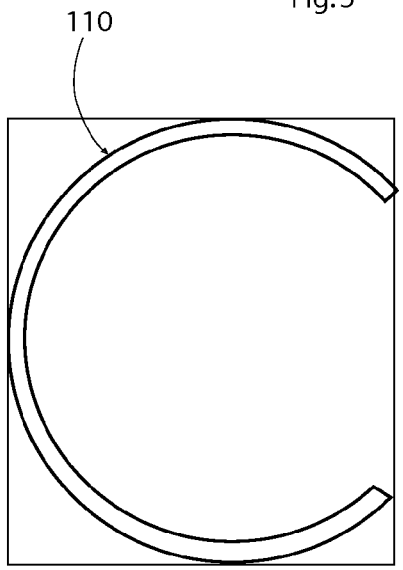
FIG. 9 is a front side view of the headband of FIG. 7.
Figure 8:
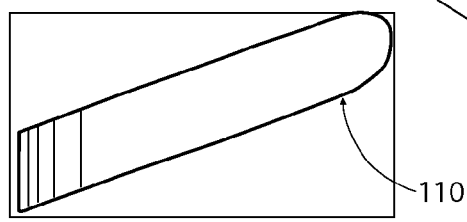
FIG. 8 is a left side view of the headband of FIG. 7.
Figure 7:
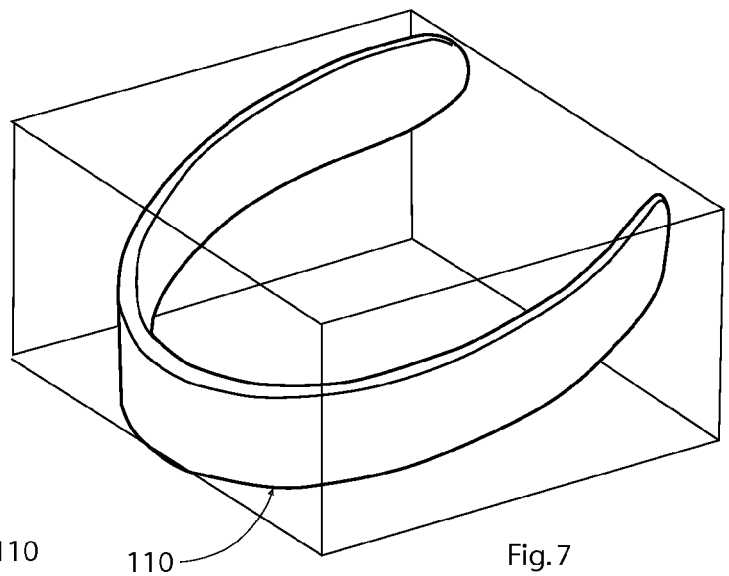
FIG. 7 is a perspective view of the headband of FIG. 3.
Figure 10:
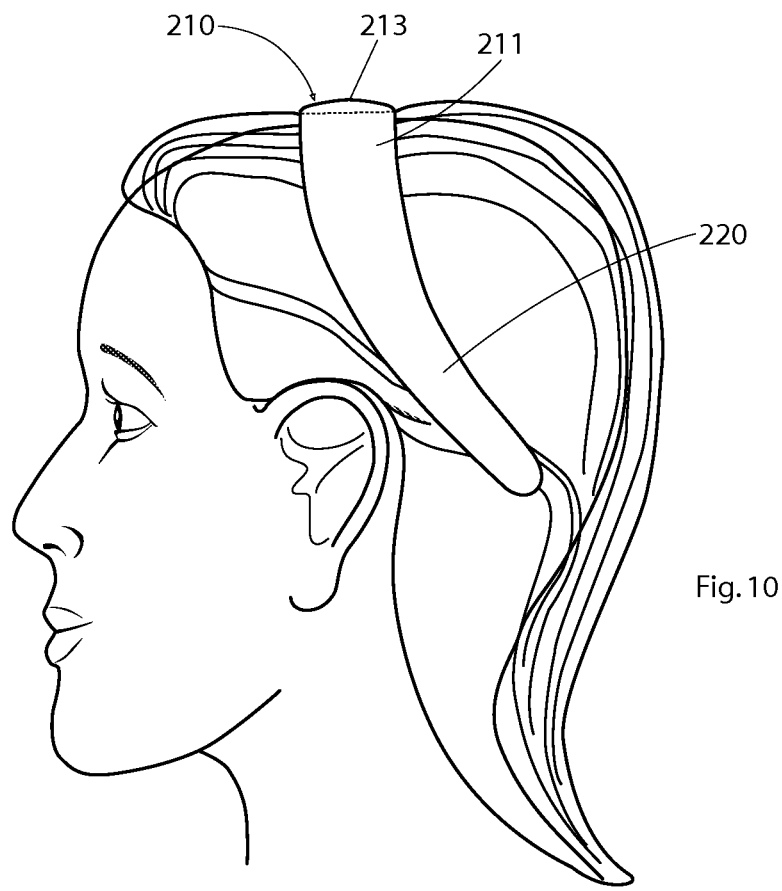
FIG. 10 is a left side view of a headband according to a second example embodiment of the present invention, showing the headband worn on a user's head without forming a rear gap between the headband rear edge and the scalp.

Another way of defining the angled top section 113 will now be described for added clarity. FIG. 6 shows a line 136 that is perpendicular to the apex line 128 of the headband top section 113. The lateral plane 118 and the perpendicular line 136 intersect to define an acute top angle 134. The top acute angle 134 is preferably about 2 degrees to about 10 degrees, more preferably about 4 degrees to about 9 degrees, and most preferably about 6 degrees to about 8 degrees. The perpendicular line 136 is oriented generally vertical when the headband 110 is properly worn on the user's head (in a generally upright position) with the top section 13 flat against the scalp 122. If the headband 110 is positioned on the head 112 so that the perpendicular line 136 is at the top acute angle relative to vertical, then the profile of the headband body 111 is a section of a circle (see FIG. 9).

With this unique angled top section, the headband body inner surface 112 better conforms to the shape of the top of the wearer's scalp when the headband 110 is properly positioned. Notably, there is no gap left between the rear edge 116 of the headband body 111 and the person's scalp 122, as exists when wearing prior art headbands (see FIGS. 1 and 2). When the top section 113 of the headband 110 is situated flatly on the wearer's scalp 122 with the apex line 128 generally horizontal so that there is no rear gap, the legs 120 are not vertical, but instead they are angled rearward so that they extend behind the wearer's ears. Because there is generally no gap, there is more inner surface area of the headband touching the head, thereby distributing the inward holding pressure over a larger area and increasing wearer comfort.

The angled-top-section feature enables the headband body 111 to conform to the contour of the top of the user's head for a better fit in that area. In another aspect of the invention, the headband body 111 is able to conform to the contour of the top and sides of the user's head for a more comfortable fit in those areas.

For this side-contour feature, the heads of a number of women were scanned and the data was translated into a 3D CAD model. From this model, it was determined that making one headband of a conventional hard plastic that would comfortably fit many head shapes would be practically impossible. Instead, a novel solution is provided whereby the headband body 111 is shapeable so that each user can manipulate the headband 110 to the shape of her particular head. To accomplish this, the headband body 111 is made of a deformable material that enables the headband body to conform to the contour of the particular user's head and retain its shape so as to not sacrifice the holding ability of the headband 110.

In typical commercial embodiments, the deformable material is a soft, memory-flex material such as a thermoplastic elastomer (TPE), acrylonitrile butadiene styrene (ABS), polypropylene (PP), polyethylene (PE), polystyrene, general styrene, cellulose acetate, acrylic, polyvinyl chloride (PVC), or a combination thereof. These deformable materials provide the ability for the headband body 111 to be deformed (flexed or shaped to comfortably conform to the unique shape of the head of the person wearing the headband 110 without breaking the headband body, to maintain the deformed shape so that the headband is held comfortably in place on the head, and to later deform the headband from the conforming shape and still later to reshape it back to fit the head.

In one particular embodiment, the deformable material is nylon 66 (PA66), which is commercially available from DUPONT (E. I. du Pont de Nemours and Company). Nylon 66 is semi-crystalline polyamide commonly used in fiber applications (carpeting, clothing, and tire cord). In addition, it is also used as an engineering material in bearings and gears due to its good abrasion resistance and self-lubricating properties. It is not known to have been used in hard plastic headbands. But the self-lubricating properties of Nylon 66 translate unexpectedly well to this application, resulting in a headband 110 that deforms to conform well to the contour of the user's head and at the same time retains that deformed shape to retain the holding ability of the headband on the head.

In another particular embodiment, the deformable material includes synthetic resinous polymers of butadiene and styrene. Such polymer resin is commercially available under the brand names K-RESIN from Chevron Phillips Chemical Company and KOSTRATE from Plastic Selection Group, Inc. (North Carolina). In addition, in this embodiment the deformable material preferably also includes a fiber reinforcement with a Shore D durometer of about 70. This deformable material (including the polymer resin and fiber reinforcement) has been test-proven to hold the contoured shape of the headband body while providing excellent physical comfort (i.e., softness) and scratch resistance.

By using one or more of these deformable materials, the headband tips 121 can be manipulated and displaced to different positions from their manufactured static positions to conform to the user's specific head shape and desired comfort level. Specifically, the headband tips 121 can be flexed inward to provide more gripping hold, or they can be flexed inward or outward to provide contouring specific to the users head shape.

A number of prototypes of the headbands 110 were fabricated of various ones of the deformable materials, and the prototypes were tested using a flat pattern that, when formed around a "fixture," created the distinctive contoured shape of the headband. The fixture is cylindrical in longitudinal cross-section (e.g., a cylinder or sphere). CAD models were constructed to do initial testing in an ABS-like plastic material along with a flexible durometer resin. So between utilizing a deformable resin material and designing it with a shape that contours to the head shape, an innovation has been found that relieves pain from the pressure of the headband tips and that sits more comfortably on the user's head.

In typical commercial embodiments, the body 111 of the headband 110 has a variable thickness of about 1.5 mm to about 2.5 mm at the tips 121 and about 3.0 mm to about 5.0 mm at the top section 113 (i.e., the section at the top when worn by a user). This variable thickness arrangement (i.e., thinner at the tips) provides the headband body 111 with a "spring" force for holding the headband 110 to the head. In other embodiments, the headband body 111 has a consistent thickness along its length. For example, the uniform thickness can be from about 1.5 mm to about 2.5 mm. Those skilled in the art will understand that these thicknesses are representative examples only and that the headband body 111 can be constructed to have other suitable thicknesses.

The headband 110 can be manufactured using conventional equipment and techniques. For example, in one embodiment the headband body 111 is injection molded into a generally semi-circular shape using only one of the deformable materials. This single-material headband 110 provides a very cost-competitive product. The generally semi-circular shape of the headband body 111 can be a contoured shape created from the CAD data of the average of the scanned head shapes and sizes.

In another embodiment, a second one of the deformable materials is over-molded or laminated into a layer on one or both sides of the contoured headband body 111. Over-molding a second one of the deformable materials, such as TPE, into an inner layer on the inside of the headband body 111 provides additional cushioning and comfort when the headband 110 is worn on the head.

Figure 21:
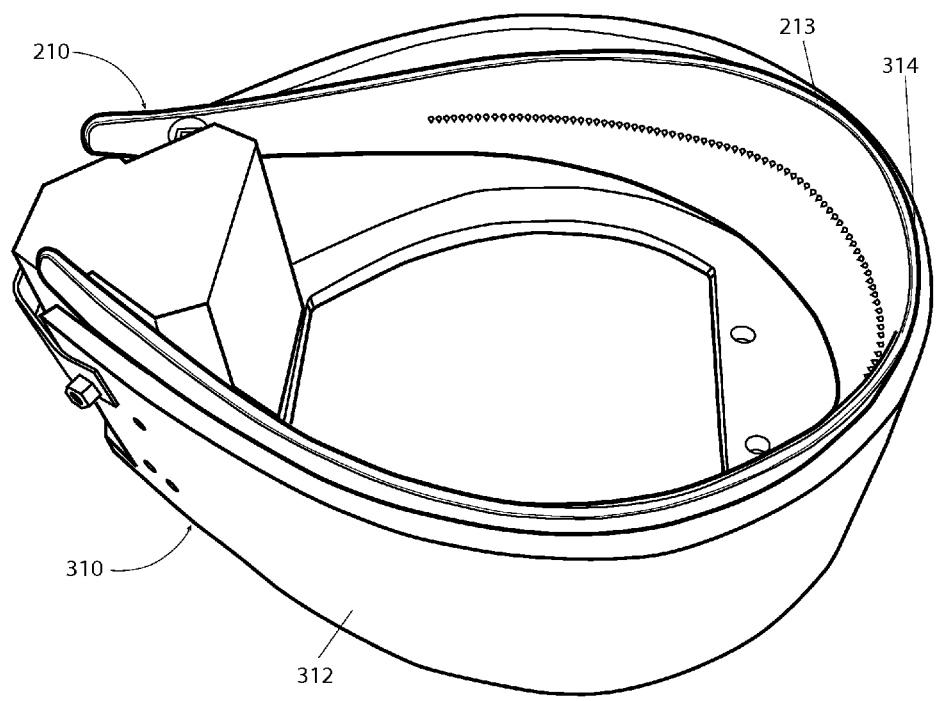
FIG. 21 is a perspective view of a fixture that is used to manufacture headbands with an angled top section

In yet another embodiment, the headband body 111 is injection molded flat or stamped out a pattern into a flat sheet of a desired one of the deformable materials. Then in another step, the flat piece is formed into a generally semi-circular, contoured shape around a "fixture" (or "buck") by heating the flat body 111 to its specific forming temperature. That temperature typically varies depending on the deformable material used and the thickness of the headband body 111 when flat. The heating can be done by placing the flat sheet into a vat of heated water. The fixture 310 is generally horseshoe-shaped and includes a twist 312 and an angled surface 314 for forming the twist (see below) and the angled top section (see above) of the headband body, respectively. A typical commercial embodiment of the fixture 310 is shown in FIG. 21.

Any of these techniques can be used to make the headbands 110 in specific colors that match trends in the fashion industry. The headbands 110 can also be covered with various fabrics to provide even greater flexibility in providing unique headbands based on various fashion trends as they arise.

In alternative embodiments, the headband body can be made to include gripping elements such as teeth (e.g., hair comb teeth) or other protruding members on the inside surface of the headband. The gripping elements can be omitted for headband designs geared toward those consumers for whom, based on their particular hair type, the teeth may tend to damage or break their hair (specifically the African-American consumer). In other alternative embodiments, the headband body can be made to include various filigree designs that can be molded through holes within the design or to include textural patterns that show up as a relief on the top surface of the headband.

In yet other alternative embodiments, the headband body is made of a non-deformable material into a contoured shape that conforms to the most typical head shape and size using the 3D CAD model data. In such embodiments, the material used can be a hard plastic, wood, metal, bone, ivory, etc. The contoured shape of the headband body can be created from multiple pieces or components adhered or otherwise coupled together. For example, metal wire or panels can be soldered or welded together (e.g., end-to-end in lengths) to form the desired contoured headband shape. Or wood can be laminated in layers or cut out of a single piece to form the desired contoured headband shape.

In use, the user grasps the legs 120 and pulls them outwardly to separate the tips 121. With the tips 121 separated, the user slips the headband 110 over her head and aligns the tips 121 behind her ears with the top section 113 of the headband 110 positioned on the top of her head. Once positioned, the headband 110 may be conformed to the shape of the wearer's head. The user may begin pressing the headband 110 against her head at the top section 113 with one or both hands. The user may then draw their hands downward along the legs 120 toward the tips 121 while applying pressure to cause the headband body 111 to deform and conform to the contour of the wearer's head. The pressure may be applied uniformly or in discrete locations along the headband body 111 until the headband 110 fits snuggly and comfortably on the wearer's head.

Figure 11:
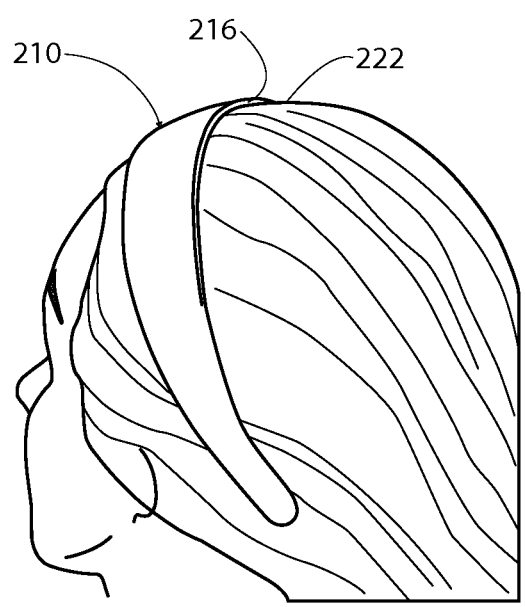
FIG. 11 is a perspective view of the headband of FIG. 10.

FIGS. 10-12, 14, and 16-19 illustrate a headband 110 according to a second example embodiment of the present invention. The headband 210 is similar to that of the first embodiment in that it includes the angled-top-section feature, the side-contour feature, or both. The headband 210 comprises a body 211 including a top section 213 and two downwardly extending legs 220. As shown in the embodiment of FIG. 11, the headband 210 does not leave a gap between the rear edge 216 and the wearer's head 222.

In this embodiment, the legs 220 sweep rearward to behind the wearer's ears. This rearward sweep can be the result of the legs 220 being smoothly curved about a single radius, smoothly but elliptically curved, irregularly curved or angled, segmented into a series of discrete linear (or curved) lengths, or the like. FIGS. 12 and 13 show the headband 210 in a flattened out position and in comparison to the flattened out prior art headband 10 of FIGS. 1-2.

Figure 2:
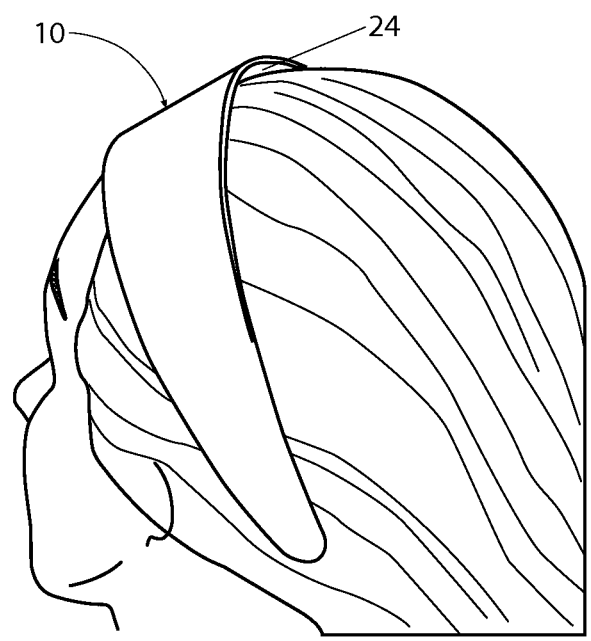
FIG. 2 is a perspective view of the prior art headband and the user's head of FIG. 1, also showing the rear gap between the headband rear edge and the scalp.
Figure 3:
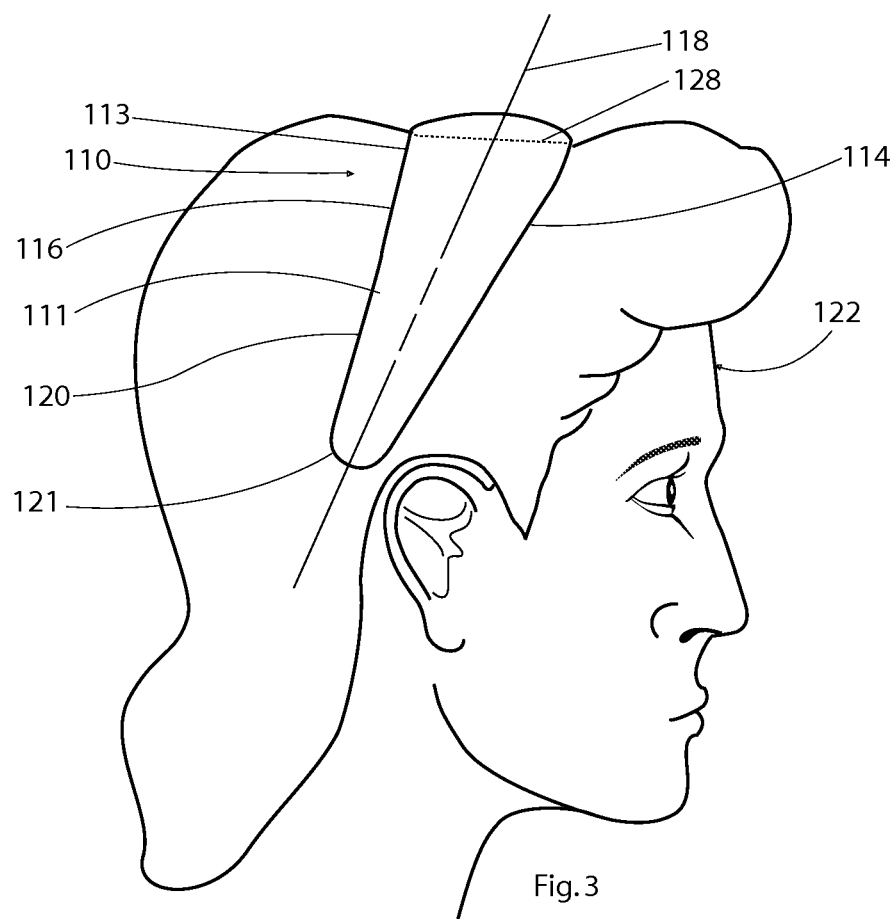
FIG. 3 is a right side view of a headband according to a first example embodiment of the present invention, showing the headband worn on a user's head without forming a rear gap between the headband rear edge and the scalp.
Figure 4:
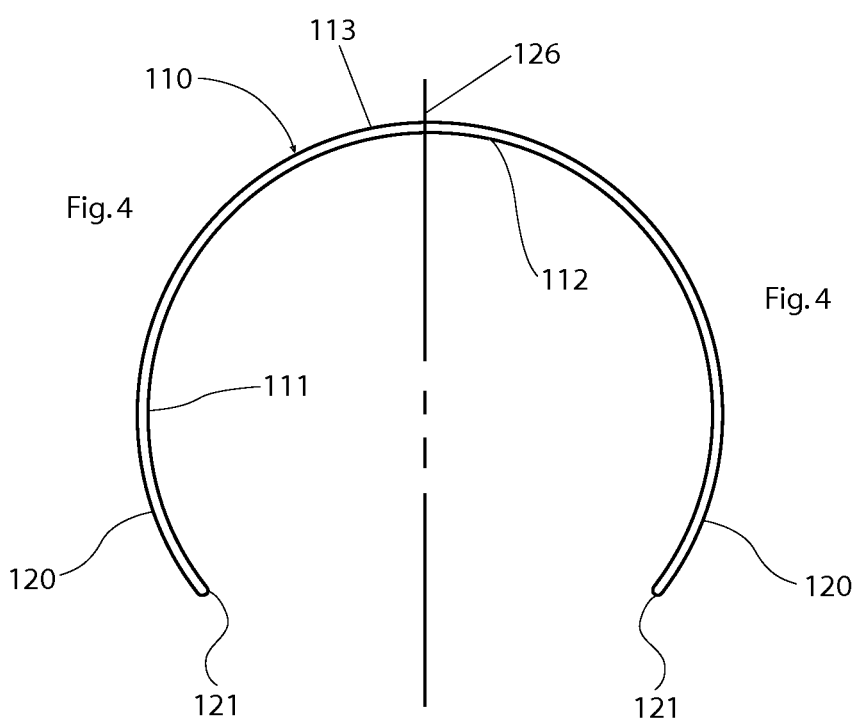
FIG. 4 is a front side view of the headband of FIG. 3.
Figure 5:
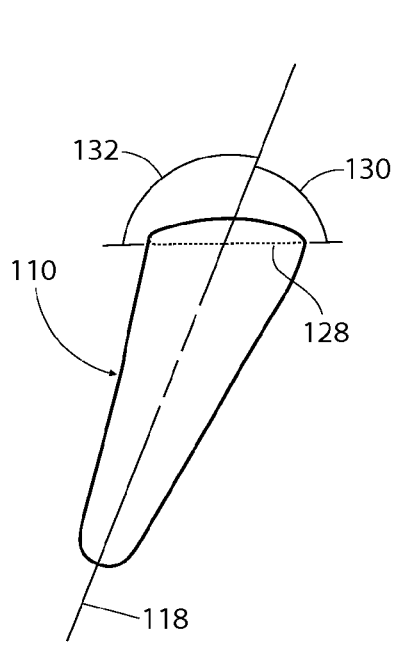
FIG. 5 is a right side view of the headband of FIG. 3, showing details of the angled top section of the headband.

FIGS. 14 and 15 show the headband 210 in its generally semi-circular shape mounted on a cylinder fixture 300 and in comparison to the prior art headband 10 of FIGS. 1-2 and 13 in its generally semi-circular shape mounted flush on the cylinder fixture. When the prior art headband 10 sits flush on the cylinder fixture 300 in the position shown in FIG. 15, the entire inner surface of the headband conforms to the cylindrical shape and the lateral centerline 18 is generally vertical. On the other hand, when the headband 210 sits on the cylinder fixture 300 in the position shown in FIG. 14, the inner surfaces of the headband legs 220 flushly conform to the cylindrical shape. But the inner surface of the top section 213 does not and the perpendicular line 236 is angled from generally vertical by the top acute angle 134. Thus, in this position, there is a front gap 229 between the apex line 228 and the cylinder 300 at the front edge of the headband 210 (see also FIG. 16), and the headband legs 220 define a section of a circle.

In addition, the headband 210 includes a twisted (or bended) aspect to its shape. This twisted shape transitions the legs 220 (which conform to the cylindrical fixture in FIGS. 14 and 16) to the top section 213 (which does not). For example, FIGS. 17-19 show the headband body 211 bending (as particularly shown by the series of cross-sections of the headband body in FIG. 18) as it extends downward from the apex line 228 of the headband 210. This is in contrast to conventional headbands 10, which have no such twist (see FIG. 21).

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A hard headband for wearing on a user's head, comprising:
   a body that is generally semi-circular and includes a top section and two oppositely arranged legs that each extend downwardly from the top section and terminate in a tip, the headband body including a front edge and a rear edge, the top section defining an inner surface that is positioned adjacent the user's head when the headband is worn,
   wherein the top section inner surface is angled to fit more closely to the contour of the top of the user's head from front to back, and, when the headband is worn on the head with the legs angled rearward so that the tips are behind the user's ears, all of the top section inner surface is against the user's head and there is no gap left between the rear edge of the headband body and the user's head,
   wherein the body has a lateral centerline that defines a lateral plane, and the inner surface is angled and not perpendicular with respect to the lateral plane, and
   wherein the body has an axial centerline that defines an axial plane, the top section inner surface intersects the axial plane to define an apex line with a front portion and a rear portion, the lateral plane and the front portion of the apex line form a front acute angle, and the lateral plane and the rear portion of the apex line form a rear obtuse angle.

2. The headband of claim 1, wherein the front acute angle is between 80 degrees and 88 degrees.

3. The headband of claim 1, wherein a line that is perpendicular to the apex line intersects the lateral plane to define an acute top angle.

4. The headband of claim 3, wherein the acute top angle is between 2 degrees and 10 degrees.

5. The headband of claim 3, wherein the perpendicular line is oriented generally vertically when the headband is properly worn on the user's head in a generally upright position with all of the top section inner surface positioned against the user's head.

6. The headband of claim 3, wherein when the headband sits on a cylinder with inner surfaces of the headband legs flushly conforming to the cylinder, the inner surface of the top section does not flushly conform to the cylinder, the perpendicular line is angled from generally vertical by the top acute angle, and the apex line and the cylinder form a front gap at the front edge of the headband.

7. The headband of claim 3, wherein when the headband body twists as it extends downward from the apex line to the tips.

8. The headband of claim 3, wherein the acute top angle is between 6 degrees and 8 degrees.

9. The headband of claim 1, wherein the headband is not reversible, and the front edge and the rear edge are oriented consistently each time the user puts on the headband.

10. The headband of claim 1, wherein the headband body is made of a deformable material that enables the headband body to be shaped to conform to the contour of the user's head and retain its shape so that the holding ability of the headband is not sacrificed, wherein the deformable material is a soft, memory-flex material selected from the group consisting of thermoplastic elastomers (TPE), acrylonitrile butadiene styrene (ABS), polypropylene (PP), polyethylene (PE), polystyrene, general styrene, cellulose acetate, acrylic, polyvinyl chloride (PVC), nylon 66 (PA66), and synthetic resinous polymers of butadiene and styrene.

11. The headband of claim 1, wherein the front acute angle is between 81 degrees and 86 degrees.

12. The headband of claim 1, wherein the front acute angle is between 82 degrees and 84 degrees.

13. A hard headband for wearing on a user's head, comprising:

a body that is generally semi-circular and includes a top section and two oppositely arranged legs that each extend downwardly from the top section and terminate in a tip, the headband body including a front edge and a rear edge, the top section defining an inner surface that is positioned adjacent the user's head when the headband is worn, wherein the body is made of a first deformable material that enables the headband body to be deformed and shaped to conform to the contour of the user's head without breaking the headband body, to retain the deformed contoured shape so that the holding ability of the headband is not sacrificed, and to be later deformed from the contoured shape and still later reshaped back to fit the head, wherein each of the tips can be deformed and shaped from their respective manufactured static positions inward and outward to conform the tips to the contour of the user's head, the first deformable material retaining the deformed shape, wherein the top section inner surface is angled to fit more closely to the contour of the top of the user's head from front to back, and, when the headband is worn on the head with the legs angled rearward so that the tips are behind the user's ears, all of the top section inner surface is against the user's head and there is no gap left between the rear edge of the headband body and the user's head, and wherein the body has a lateral centerline that defines a lateral plane, the headband body has an axial centerline that defines an axial plane, the top section inner surface intersects the axial plane to define an apex line with a front portion and a rear portion, the lateral plane and the front portion of the apex line form a front acute angle, and the lateral plane and the rear portion of the apex line form a rear obtuse angle.

14. The headband of claim 13, wherein the first deformable material is a soft, memory-flex material selected from the group consisting of thermoplastic elastomers (TPE), acrylonitrile butadiene styrene (ABS), polypropylene (PP), polyethylene (PE), polystyrene, general styrene, cellulose acetate, acrylic, polyvinyl chloride (PVC), and nylon 66 (PA66).

15. The headband of claim 13, wherein the first deformable material includes synthetic resinous polymers of butadiene and styrene.

16. The headband of claim 15, wherein the first deformable material includes a fiber reinforcement.

17. The headband of claim 16, wherein the fiber reinforcement has a Shore D durometer of 70.

18. A method of manufacturing the hard headband of claim 17, comprising:

fabricating a flat sheet of the deformable material,
providing a fixture with a contoured shape,
placing the flat sheet onto or into the contoured fixture, and
heating the flat sheet until it conforms to the contoured shape of the fixture,
wherein the fixture includes a twist and an angled surface for forming the twist and the angled inner surface of the headband body, respectively.

19. The headband of claim 13, wherein the first deformable material is Nylon 66 (PA66).

\* \* \* \* \*